United States Patent [19]
Johnson

[11] 3,718,038
[45] Feb. 27, 1973

[54] FORCE MEASURING INSTRUMENT

[76] Inventor: Clarence Johnson, 31649 Trillium Trail, Pepper Pike, Cleveland, Ohio

[22] Filed: Jan. 26, 1971

[21] Appl. No.: 109,851

[52] U.S. Cl. .............................. 73/141 A, 73/432 A
[51] Int. Cl. ............................................. G01l 1/04
[58] Field of Search ..................... 73/141 A, 432 A

[56] References Cited

UNITED STATES PATENTS

| 3,099,156 | 7/1963 | Perry, Jr. ........................ 73/141 A |
| 1,999,075 | 4/1935 | Bauer et al. ..................... 33/147 D |

FOREIGN PATENTS OR APPLICATIONS

| 447,030 | 3/1948 | Canada ............................. 73/141 A |

*Primary Examiner*—Jerry W. Myracle
*Attorney*—Strauch, Nolan, Neale, Nies & Kurz

[57] ABSTRACT

A force transducer having a force sensing deflection structure adapted to receive and be deflected by a force to be measured, a device providing a measurement of deflection, and deflection transmission linkage interconnecting the force sensing structure and the above-mentioned device. The transmission linkage comprises a number of serially connected parts which amplify the transmitted deflection and which are rigidly connected one to another to eliminate lost motion. The force sensing structure is formed with two deflection portions which are rigidly joined to each other only outwardly of an intermediate deflection space. These deflection portions are deflected by an applied force in such a manner that the deflected and undeflected positions of the region at which deflection is measured remain effectively parallel.

1 Claim, 11 Drawing Figures

INVENTOR
CLARENCE JOHNSON

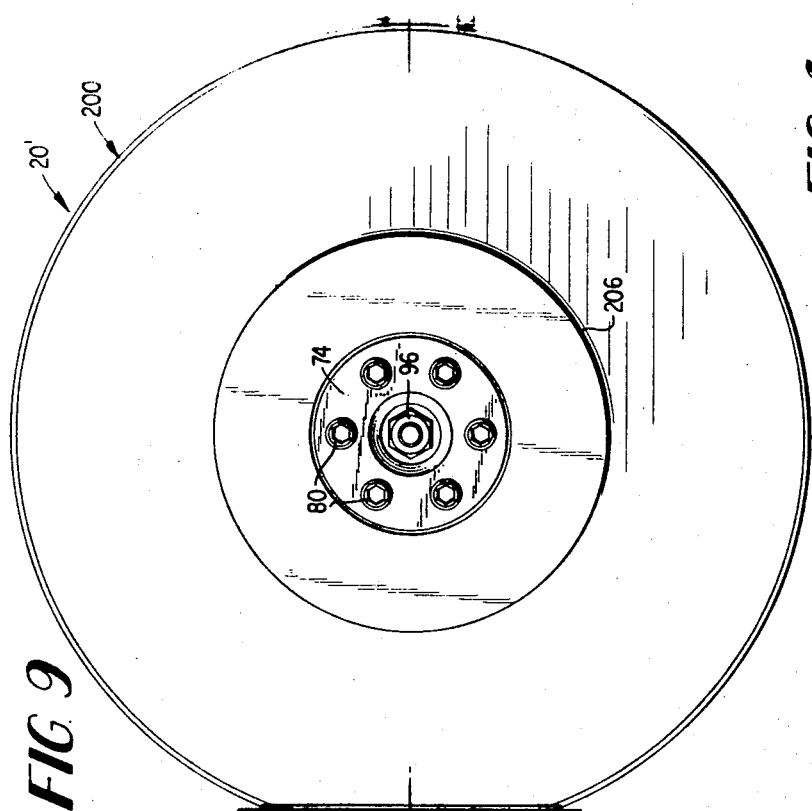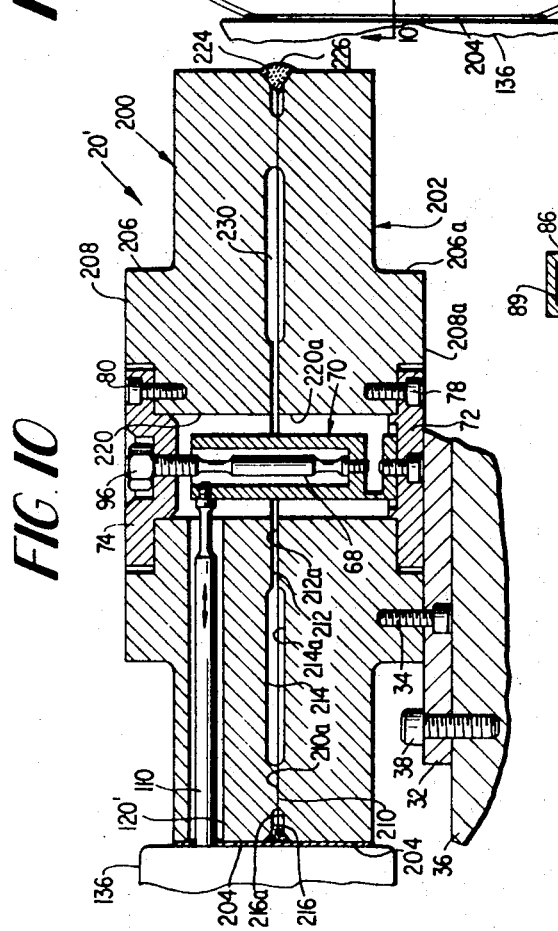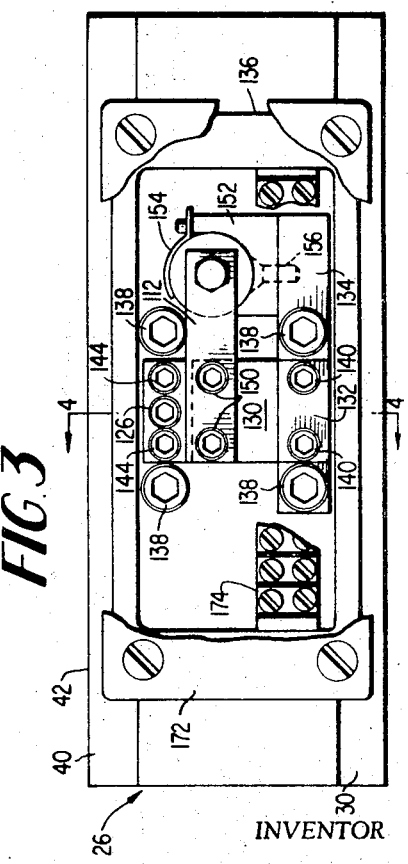

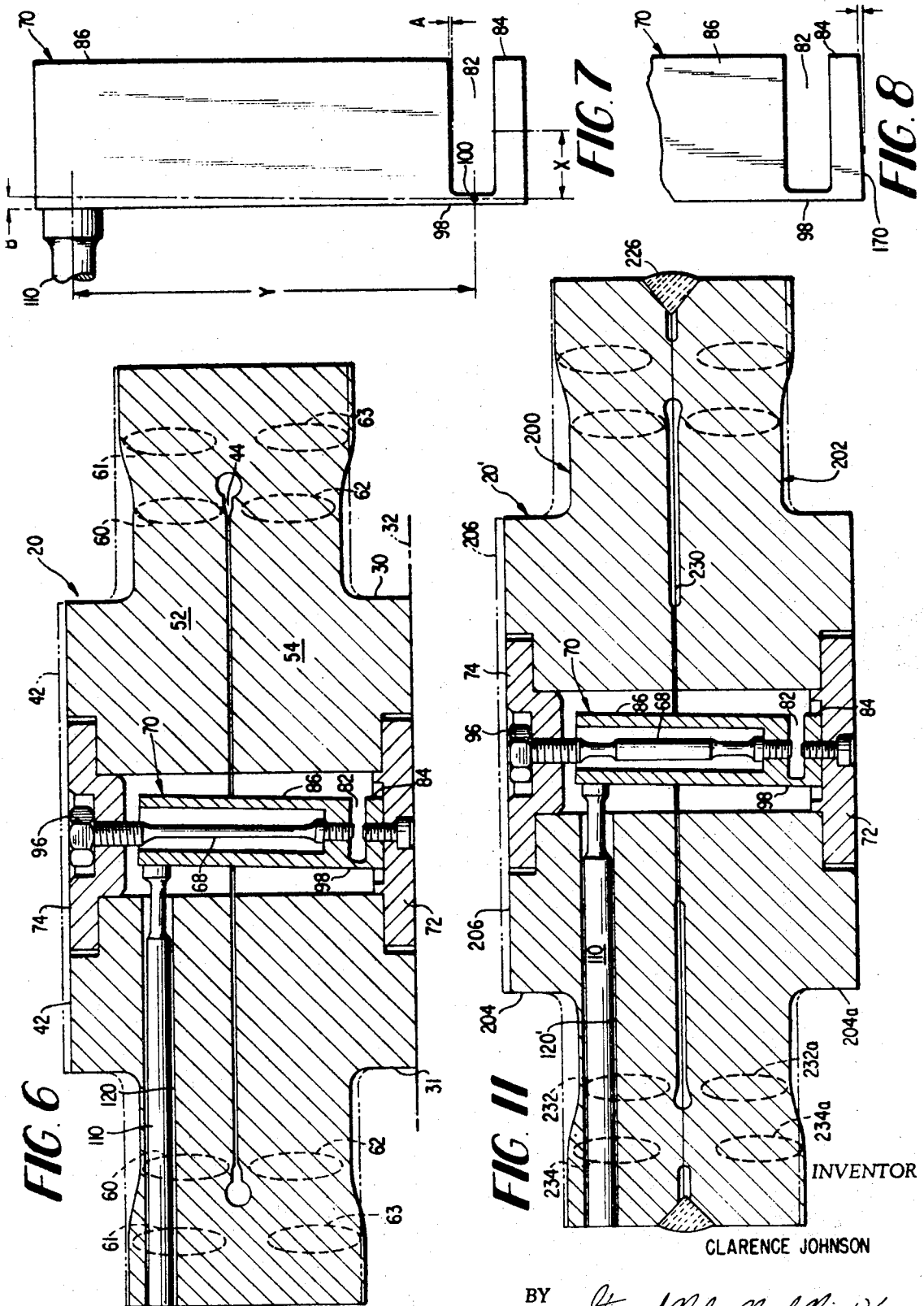

FORCE MEASURING INSTRUMENT

FIELD OF INVENTION

This invention relates force transducers for measuring forces and is particularly directed to that type of force transducers wherein a deflection or force sensing structure is flexed at predetermined regions by the applied force to provide a measurable deflection.

SUMMARY & OBJECTS OF INVENTION

The force sensing structure of this invention is formed with a pair of deflection portions that are spaced from each other in an intermediate deflection region and are rigidly joined together outwardly of the intermediate deflection region. The deflection space between the two deflection portions extends transversely of the applied force so that when the force is applied to one of the deflection portions it will be deflected in the region of the deflection space by a magnitude corresponding to that of the applied force.

This force-representing deflection of the above-mentioned force sensing structure is transmitted by a novel motion transmitting linkage to a suitable device that provides a measure of the deflection. Such a device may be a transformer in which the core is moved by a magnitude corresponding to the magnitude of deflection to correspondingly vary an electrical signal by a magnitude representing the magnitude of the applied force.

The motion transmitting linkage mentioned above comprises a first deflection transmission member such a rod which is rigidly fixed at one end to the force sensing deflection portion to which the force is applied. The other end of the first deflection transmission member is fixed to a second deflection transmission member which is fixed to the other of the above mentioned force sensing deflection portions.

The second deflection transmission member is constructed in such a manner that it changes the direction of deflection and amplifies the magnitude of the deflection. To accomplish this the second deflection transmission member has a flexure region of relatively narrow thickness so that is acts as a yieldable hinge, and the first deflection transmission member is fixed to the second deflection transmission member at a first lever arm distance from the flexure region. As a result, axial displacement of the first deflection transmission member flexes the second deflection transmission member at its above-mentioned flexure region to thereby cause a part of the second deflection transmission member to effectively pivotally deflect about the above-mentioned yieldable hinge.

A third deflection transmission member is fixed at one end to the pivotally deflectable part of the second deflection transmission member at a second lever arm distance from the yieldable hinge. The second lever arm distance is considerably larger than the first lever arm distance. As a result, the deflection transmitted to the third deflection transmission member is amplified by a magnitude corresponding to the ratio of the second lever arm distance to the first lever arm distance.

The third deflection transmission member is rigidly connected to the transformer core by one or more parts so that each part in the motion transmitting linkage is rigidly connected to another to eliminate lost motion and friction. Thus, an amplified deflection accurately representing the magnitude of the applied force is transmitted to the transformer or other measuring device.

The second deflection transmission member is furthermore formed with a well for receiving the first deflection member to provide a compact assembly that is effective to reduce the overall height of the transducer.

According to a further feature of this invention, the first deflection transmission member is adjustable to pre-load the flexure region of the second deflection transmission in tension. As a result, the second deflection transmission member will not normally be subjected to the less stable condition of compression.

In one embodiment of this invention, the force sensing structure mentioned above is a one piece metallic member which has an intermediate slot formed therethrough to define the deflection space and the two deflection portions on opposite sides of the space. In a second embodiment, the force sensing, deflection portions are fabricated as two separate parts which are rigidly joined together by suitable means such as welding or bolts. In this second embodiment the opposing intermediate surfaces of the deflection portions are relieved to define the above-mentioned deflection space. The force transducer of this invention is particularly adapted for measuring relatively heavy forces.

With the foregoing in mind, a major object of this invention is to provide a novel force transducer in which a force sensing structure has a pair of deflection portions and an intermediate deflection space defined between the deflection portions.

Another major object of this invention is to provide a novel, compact deflection transmission linkage that transmits and amplifies force-induced deflection without lost motion and without friction attributable to relatively movable parts.

There and other objects will appear as the description proceeds in connection with the appended claims and below-described drawings.

DESCRIPTION OF DRAWINGS

FIG. 3 is a left side elevation taken along lines 3—3 of FIG. 1 with a cover portion broken away to show details of parts housed in the illustrated terminal box;

FIG. 4 is a section taken substantially along lines 4—4 of FIG. 1;

FIG. 5 is a section taken substantially along lines 5—5 of FIG. 2;

FIG. 6 is a fragmentary sectioned view similar to FIG. 2, but showing the flexed, deflected configuration of the force sensing structure in solid lines and a partial outline of the undeflected configuration in phantom lines;

FIG. 7 is an enlarged fragmentary portion of the sectioned view in FIG. 2;

FIG. 8 is an enlarged fragmentary view of one of the deflection transmission members shown in FIG. 2;

FIG. 9 is a fragmentary plan view of the force transducer according to another embodiment of this invention;

FIG. 10 is a section taken substantially along lines 10—10 of FIG. 9; and

FIG. 11 is a fragmentary sectioned view similar to FIG. 10, but showing the flexed, deflected configuration of the force sensing structure in solid lines and a partial outline of the undeflected configuration in phantom lines.

DETAILED DESCRIPTION

Figure 1:
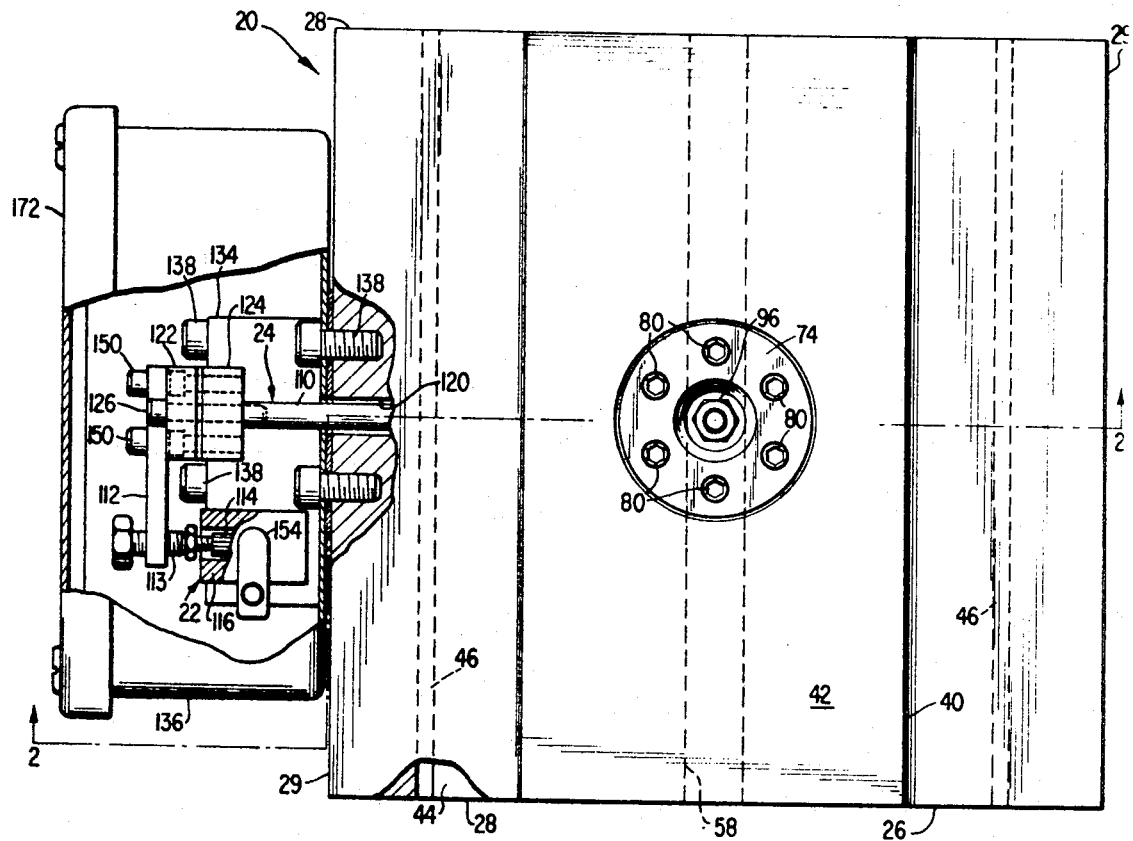
FIG. 1 is a plan view of a force transducer according to one embodiment of this invention, with exterior portions being broken away to show various details.
Figure 2:
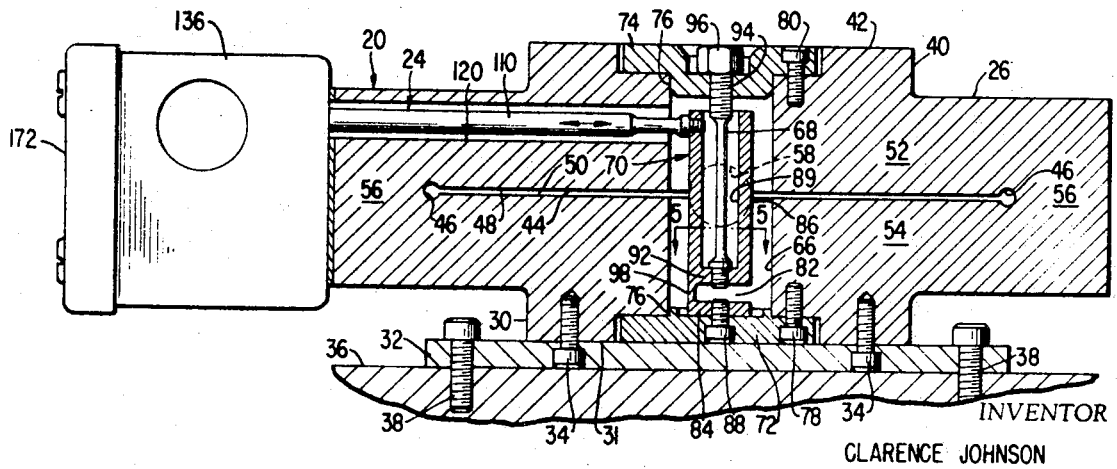
FIG. 2 is a section taken substantially along lines 2—2 of FIG. 1.

Referring to the drawings and particularly to FIGS. 1 and 2, the force transducer of this invention mainly comprises a force-sensing, deflection structure 20 which is deflectable by an applied force to be measured, an energy conversion device such as a transformer 22 for converting force-induced motion or deflection into a force-representing electrical signal, and a motion-transmitting linkage 24 for transmitting the deflection of structure 20 to transformer 22.

In this embodiment structure 20 is a one-piece member or block 26 which is formed from any suitable elastically deformable metal such as AISI type A2 steel. Block 26 has a rectangular configuration which is defined by two pairs of flat side faces indicated at 28 and 29 respectively. It will be appreciated, however, that block 26 may alternately be formed with any other suitable configuration such as a circular one.

As best shown in FIG. 2, block 26 is formed with a depending land 30 extending perpendicularly between side faces 28 and inwardly of side faces 29. Land 30 terminates in a flat, downwardly facing seating surface 31 which is adapted to seat on a flat-sided mounting plate 32 or other transducer support surface. Block 26 is rigidly fixed to mounting plate 32 by any suitable means such machine screws 34. Plate 32 is seated on a rigid support 36 and is rigidly fixed thereto by machine screws 38.

The top face of block 26 is formed with an upwardly projecting land or portion 40 which is preferably coextensive with land 30. Land 40 terminates in an upwardly facing, flat, force-receiving surface 42. Forces to be measured are normally applied to surface 42. As shown, lands 30 and 40 extend medially between side faces 29, and surfaces 31 and 42 are parallel. An unshown plate or force-receiving platform, or other structure may be mounted on the top face of land 40 for receiving the forces to be measured.

Still referring to FIGS. 1 and 2, a flat sided slot 44 formed through block 46 extends from one end face 28 to the other end face 28. Slot 44 is preferably disposed medially between end faces 29 and is closed by parallel side edges 46 which may be enlarged to prevent objectionable concentrations of stresses in block 26. Thus, slot 44 is open at opposite ends and closed along its side edges 46.

As shown in FIG. 2, slot 44 is substantially medially disposed between the top and bottom faces of block 26 and, in this embodiment, is disposed equidistantly between surfaces 31 and 42. Slot 44 is parallel to surface 42 and is delimited by flat top and bottom wall surfaces 48 and 50. Wall surfaces 48 and 50 are parallel in the undeflected configuration of block 26 shown in FIG. 2.

By virtue of the foregoing slotted block construction, slot 44 divides block 26 into upper relatively thick deflection plate portion 52 and a lower, relatively thick deflection plate portion 54 which are integrally joined together only at two regions indicated at 56. Regions 56 each extend between one side face 29 and the adjacent side edge 46 of slot 44. Plate portion 52 may be the mirror image of plate portion 54 along an interface entending parallel to and medially between wall surfaces 48 and 50. A bore indicated at 58 is initially formed through block 26 to provide for the insertion of a saw blade for forming slot 44.

When a force having a component disposed at right angles to surface 42 and slot 44 is applied to surface 42, plate portions 52 and 54 will be deflected in the manner shown in solid lines in FIG. 6. If the force is downwardly directed as viewed from FIGS. 2 and 6, both of the deflection plate portions 52 and 54 will be placed in compression.

By virtue of slot 44, plate portion 52 will flex in effectively two pairs of parallel, spaced apart regions 60 and 61 (see FIG. 6) extending longitudinal of and substantially parallel to slot 44. Likewise, plate portion 54 will flex in two corresponding pairs of parallel, spaced regions respectively indicated 62 and 63 in FIG. 6. These four flexure regions are substantially parallel and are disposed medially of a vertical plate medially and normally intersecting slot 44. Flexure regions 60 and 62 are respectively disposed inwardly of flexure regions 61 and 63, and the curvature of flexure of regions 60 and 62 are respectively inverse to that of regions 61 and 63. As a result, the deflecting section of plate portion 52 extending within flexure regions 60 and the deflecting section of plate portion 54 extending within regions 62 will remain substantially parallel and normal to the applied force component. Moreover, surface 42, upon being deflected will remain in a plane that is parallel to a plane containing surface 42 in its undeflected position. Thus, the part of portion 52 within regions 60 will deflect vertically and will not tilt in one direction or the other. As a result, the section of plate portion 52 extending within regions 60 and surface 42 will vertically deflect or displace by a magnitude substantially proportional to the magnitude of the applied force. This force-representing travel or deflection is relatively small and may, for example, be on the order 0.010 inches maximum.

As shown in FIG. 2, a stepped, smooth walled, vertical bore 66 is formed through block 26 for receiving a deflection transmission rod 68 and a deflection transmission post 70. Rod 68 and post 70 form a part of linkage 24 and will be described in detail later on.

Bore 66 is disposed centrally in block 26 and perpendicularly intersects slot 44 along an axis that is disposed medially between the open slot ends and medially between side edges 46. The opposite ends of bore 66, which respectively open at surfaces 31 and 42 are closed by flanges 72 and 74 respectively.

Each of the flanges 72 and 74 is seated in a diametrically enlarged, stepped end portion of bore 66 and has a hub extension 76 which is interfittingly received with a close piloting fit in the intermediate reduced diametered section of bore 66. Flange 72 is rigidly fixed to land 30 by machine screws (one shown) indicated at 78, and flange 74 is rigidly fixed to land 40 by machine screws indicated at 80.

Post 70, which is longitudinally received in bore 66 axially between flanges 72 and 74, is notched at 82 adjacent to its lower end to form a mounting foot section 84 and a motion-transmitting arm section 86. Foot section 84 is rigidly fixed to flange 72, by a machine screw 88.

As shown, arm section 86 is formed with a well 89, having an open upper end and a low end that is closed by a wall portion 92. Rod 68 is freely received in well 89 and has a lower threaded end which is securely threaded into a tapped bore that is formed through wall portion 92. Rod 68 extends longitudinally of arm section 86 and has an upper threaded end 94 which extends through the open end of well 89 and which is securely threaded through a tapped bore in flange 74. Rod 68 is thus anchored or rigidly fixed at opposite ends respectively to wall portion 92 and flange 74. The threaded end 94 terminates in a nut 96 to provide a pre-loading feature that will be described later on.

As shown in FIGS. 2 and 7, notch 82 is open on three sides so that foot section 84 and arm section 86 are integrally joined together only by a relatively thin flexure section 98. Post 70 is fabricated from tool steel or other suitable material so that section 98 is capable of being flexed in a manner to be described shortly.

Rod 68 is substantially axial with bore 66, and flexure section 98 is laterally offset from the longitudinal axis of rod 68, so that when a force is applied through and axially of rod 68, section 98 will be flexed and thus act as a yieldable hinge to effectively provide for the pivotal deflection of arm section 86 about a pivot axis indicated at 100 in FIG. 7.

From the foregoing construction it will be appreciated that rod 68 and the intermediate section of portion 52 between regions will deflect as a unit under the influence of the applied force. Thus, rod 68 will axially apply a force to wall portion 92, causing section 98 to be flexed. Arm section 86 will thereby be pivotally deflected about axis 100 and through an angle that is proportional to the magnitude of the force being measured.

As shown in FIGS. 1-4, linkage 24 further comprises a motion-transmitting rod 110, an arm 112 and a threaded member 113. Transformer 22 has a core 114 and a winding assembly 116. Transformer 22 is advantageously of the linear variable differential type. The deflection produced by the force being measured is transmitted serially through rod 68, post 70, rod 110, arm 112, and member 113 to core 114 to thereby axially displace core 114 relative to winding assembly 116 and by a magnitude that is proportional to the magnitude of the force being measured.

As shown in FIG. 2, one end of rod 110 is threaded and is securely threadedly received in a tapped bore in the upper end of arm section 86. Rod 110 extends radially of post 70 and rod 68 and along an axis that transversely intersects the longitudinal axis of rod 68 and post 70. When the transducer is positioned in the manner shown in drawings, rod 110 will be substantially horizontal and rod 68 will be substantially vertical.

As shown in FIGS. 2 and 4, rod 110 extends freely and coaxially through a bore 120 that is formed in the upper deflection plate portion 52 of block 26. Bore 120 is formed along an axis normally intersecting the longitudinal axis of bore 66 and opens at one end into bore 66. The opposite end of bore 120 opens at the left-hand side face 29 as viewed from FIG. 1.

The end of rod 110 opposite from post 70 is rigidly fixed to a pair of clamping blocks 122 and 124 by a machine screw 126. Thus, one end of rod 110 is rigidly fixed to the upper end of arm section 86, while the other end of rod 110 is rigidly fixed to clamping blocks 122 and 124.

As shown in FIG. 4, the assembly of clamping blocks 122 and 124 is supported by a flat-sided flexure plate 130, and flexure plate 130 is mounted by a pair of support blocks 132 and 134. A terminal box 136 houses transformer 22, support blocks 132 and 134, flexure plate 130, clamping blocks 122 and 124, arm 112 and member 113. Terminal box 136 is rigidly fixed to block 26 by machines screws 138 (see FIG 1). A pair of the screws 138 (see FIG. 3) rigidly fixes support block 134 to block 26. This pair of screws extend through smooth walled through bores in support block 134 and are threaded into blind tapped bores in block 26.

Referring again to FIG. 4, the lower marginal edge portion of flexure 130 is securely clamped between opposing flat faces of support blocks 132 and 134 by machine screws 140. Each of the screws 140 extends through smooth walled bore in support block 132 and an aligning aperture in flexure plate 130 and is threaded into a tapped bore in support block 134.

With continued reference to FIG. 4, the upper marginal edge of flexure plate 130 is securely clamped between clamping blocks 122 and 124 by screw 126 and an additional pair of machine screws 144 (see FIG. 3). Each of the screws 144 extends through a smooth walled bore in clamping block 122 and an aligning aperture in flexure plate 130 and is threaded into a tapped bore in clamping block 124.

Screw 126 extends through a smooth walled bore in clamping block 122, an aligning aperture in flexure plate 130, and an aligning smooth walled bore in clamping block 124 and is threaded into a blind tapped bore formed in the end of rod 110 along an axis aligning with the longitudinal axis of rod 110. Thus the left-hand end of rod 110 is supported on the upper free end of flexure plate 130, and flexure plate 130 is supported in cantilever fashion by support blocks 132 and 134 which are mounted on block 26.

Arm 112, as shown in FIGS. 1,3 and 4, is rigidly fixed to clamping block 122 by machine screws 150 and extends laterally of rod 110. Member 113 is threaded through arm 112 at a region that is laterally offset from rod 110 and along an axis that is parallel to that of rod 110.

As shown in FIG. 1, member 113 is coaxially threaded into core 114 to thereby support core 114 along an axis that is parallel to and spaced apart from rod 110. Winding assembly 116, as shown in FIG. 3, is interfittingly seated on a cradling support block 152 and is rigidly fixed to block 152 by a suitable bracket and screw assembly 154. Block 152, in turn, is supported on block 134 and is rigidly fixed thereto by machines screws one of which is indicated at 156 in FIG. 3. Winding assembly 116 is so positioned that core 114 is coaxially received in the core hole of the winding assembly as shown in FIG. 1.

Flexure plate 130 is fabricated from a tool or spring steel or other suitable material. In its unflexed condition, as shown in FIG. 4, flexure plate 130 is contained in a vertical plane that normally intersects the longitudinal axis of rod 110. When rod 110 is displaced in either direction by plane deflection of arm section 86, flexure plate 130 will be flexed in two regions, and these flexure region will be of opposite curvature as indicated by the linked line 160 in FIG. 4. As a result, the upper and lower clamped marginal edges of flexure plate will remain in substantially parallel planes normally intersecting the axis of rod 110. By virtue of plate 130, the axis of rod 110 in the deflected position of the rod will remain parallel to the rod's axis in its undeflected position. Thus a plane containing the axis of rod 110 in its deflected position will remain parallel to the horizontal plane which contains the rod's axis in the undeflected position of the rod. It will be appreciated that rod 110 is axially displaced by pivotal or rocking deflection of arm section 86. Since core 114 is rigidly fixed to rod 110 by clamping block 122 and screw 126, core 114 will be axially displaced by a magnitude equal to the axial displacement of rod 110. Moreover, core 114 will remain parallel to rod 110.

In summary, application of the force to be measured axially displaces rod 68 to flex section 98 and thereby pivot or rock arm section 86 about its yieldable pivot at 100. This pivotal deflection of arm section 86 is translated back into axial motion such that rod 110 and consequently, core 114 will axially be displaced by a magnitude that is proportional to the applied force. Thus, the electrical output of winding assembly 116 will correspondingly be varied and consequently will be representative of the magnitude of the applied force. For a linear variable differential type transformer, the axial displacement of core 114 will alter the relative flux distribution between the primary and secondary coils of assembly 116 so that axial motion of core 114 in one direction or the other results in an increased output of one phase or the other. This secondary output of the transformer may be applied an unshown filter network to develop an analog signal whose magnitude is proportional to the magnitude of the applied force. It will be appreciated that the transducer of this invention is capable of measuring forces in tension as well as forces in compression.

The pivot axis 100 about which arm section 86 is pivotally deflectable is perpendicular to and laterally offset from the axis of rod 68 by a lever arm distance indicated at X in FIG. 7. Rod 110 is perpendicular to and laterally offset from the pivot axis 100 by a lever arm distance indicated at Y in FIG. 7. Thus, post 70 provides two lever arms respectively indicated by the reference characters X and Y, with the latter being considerably longer than the former. Thus, the pivotal deflection of lever arm Y, which is indicated at B in FIG. 7, will be proportionately greater than the pivotal deflection A of lever X. Post 70 therefore changes direction of the force-induced deflection and amplifies the deflection by the ratio of Y/X. It will be appreciated that wall portion 92 defines lever arm X and that the upstanding part of arm section 86 defines lever arm Y. These two lever arms are essentially mutually perpendicular and are joined at an apex region containing pivot axis 100.

By virtue of amplifing the force-induced deflection, and by virtue of transmitting the amplified deflection to axially displace core 114, the force transducer is expectionally sensitive to relatively small deflections of structure 20. Furthermore, it is clear from the foregoing description that no lost motion or objectionable friction occurs in linkage 24. As a result, highly accurate force measurements are obtainable.

In addition, it will be appreciated that the construction of linkage 24 is simplified and exceptionally compact particularly in an axial direction along rod 68. As a result, the overall height or thickness of the transducer is relatively small, thus enabling it to be positioned in relative small spaces.

As shown in FIG. 8, the bottom surface of foot section 84, which seats against flange 72, is indicated at 170. Surface 170 is flat and is inclined at a small angle from a plane which perpendicularly intersects the longitudinal axis of post 70. The angle at which surface is inclined may, for example, be on the order of 0°30'. Thus when foot section 84 is initially seated on flange 72 and before nut 96 is turned in a direction to tension rod 68, the longitudinal axis of post 70 will be angularly offset from a vertical plane containing the axis of rod 68 by an angle equal to the incline of surface 170. By now turning nut 96 to thread end portion 94 upwardly (as viewed from FIG. 2) and to thereby tension rod 68, post 70 will be flexed at section 98 to bring arm section 86 to a position where it is vertical (as seen from FIG. 2) and in axial alignment with the axis of rod 68. As a result, the flexed region of post 70 is pre-loaded in tension which is a more stable condition then compression. Without this feature, post 70 could go into compression and therefore be subject to buckling under the influence of the applied force being measured.

Member 113 may selectively be threaded in either direction through its tapped bore in arm 112 to thereby selectively axially adjust core 114 without altering the position of the remainder of linkage 24 or causing deflection of structure 20.

Terminal box 136, as best shown in FIGS. 1 and 4, is open on one side to provide access to the parts housed therein. A cover plate 172 is removably mounted on box 136 to cover the open side thereof. A terminal block 174 is mounted in box 136 for making the electrical connections to transformer 22.

In the embodiment shown in FIGS. 9–11, the force sensing, deflection structure 20 is replaced by a modified force sensing structure generally indicated at 20'. In this modified force sensing structure, the two force deflection portions are separately formed and are relieved along opposing faces to define the force deflection space as will now be described in detail.

Except for structure 20' the transducer shown in FIGS. 9–11 is the same as the transducer shown in FIGS. 1–8. Accordingly, like reference character have been applied to designate like parts in the embodiment of FIGS. 9–11.

As shown in FIGS. 9 and 10, structure 20' comprises a pair of separately formed relatively thick force deflection plate members 200 and 202 which in assembled relation respectively define the two force deflection portions mentioned above. Members 200 and 202 are each formed with a circular configuration except for a flat side face indicated at 204. Members 200 and 202 may be fabricated from the same material as block 26. The diameters of members 200 and 202 are substantially equal, and member 200 is seated on member 202 such that the two side faces 204 are in a common plane which normally intersects a radial plane containing the aligned longitudinal axes of members 200 and 202. Side faces 204 provide a mounting surface against which terminal box 136 is seated in the manner shown. Terminal box 136 and support block 134 are fixed to members 200 and 202 in the manner described in the previous embodiment.

Still referring to FIGS. 9 and 10, deflection member 200 is coaxially formed with an upwardly projecting annular land 206 which terminates in a flat, annular, force-receiving surface 208. Surface 208 is contained in a plane that perpendicularly intersects the aligned axes of members 200 and 202. The force to be measured may be applied to surface 208. Land 206 may mount an unshown force-receiving plate, platform or other structure. Surface 208 will be normal to at least a component of the force being measured.

The underside of deflection member 200 facing member 202 is relieved to form a pair of concentric annular lands 210 and 212 which terminate in flat annular faces as shown. Land 210 is defined between an annular groove 214 and annular stepped region 216. Groove 214 extends between lands 210 and 212 so that land 212 is defined on side by groove 214 and on the other by a stepped, smooth walled bore 220 which is coaxially formed through deflection member 200.

As shown in FIG. 9, deflection member 200 is formed with a radial bore 120' which corresponds to bore 120 for freely, longitudinally receiving rod 110. Bore 120' is formed along an axis normally intersecting the axis of bore 220. The inner end of bore 120' opens into bore 220, and the outer end of bore 120' opens at side face 204.

Except for bore 120' deflection member 202 is essentially the mirror image of deflection member 200. Accordingly, like reference numerals suffixed by the letter a have been applied to designate like portions of deflection member 202.

As shown in FIG. 9, the stepped regions 216 and 216a are formed just inwardly of the outer peripheries of deflection plates 200 and 202 and terminate in an annular radially outwardly facing groove 224 of V-shaped cross section for receiving an endless, generally annular weld bead 226. Bead 226 integrally and rigidly joins deflection members 200 and 202 together along their outer peripheries. This is the only region in which deflection members 200 and 202 are rigidly joined or fixed to each other.

In the assembled relation of deflection members 200 and 202 the flat, the annular surfaces of lands 210 and 210a interfittingly seat against each other along a planar interface that normally intersects the aligned axes of members 200 and 202. For measuring forces within the rated capacity of the transducer, deflection members 200 and 202 seat against or engage each other only along their seating faces on lands 210 and 210a, which faces are disposed radially inwardly of weld bead 226.

The flat faces of lands 212 and 212a are normally axially spaced from each other in parallel planes that normally intersect the aligned axes of deflection members 200 and 202. Thus the circular deflection space between deflection members 200 and 202 is disposed radially inwardly of lands 210 and 210a and is indicated at 230 in FIG. 10. Deflection space 230 corresponds to groove 44 in the previous embodiment and enables deflection members 200 and 202 to be deflected and flexed by application of a force to surface 208 in the manner shown in FIG. 11. Abutment of land 208 against land 212a limits relative deflection of members 200 and 202.

Faces 206 and 206a are parallel, and face 206a seats against mounting plate 32. Deflection member 202 is rigidly fixed to mounting plate 32 by screws 34.

In cross section, deflection members 200 and 202, as shown in FIG. 11, are deflected in a manner similar to deflection portions 52 and 54. More particularly, deflection member 200 will be flexed by application of the force to be measured at two coaxial, radially spaced apart, annular regions 232 and 234, with region 234 being disposed radially outwardly of region 232. The flexure curvature of region 232 is opposite to that of region 234. As a result, the central, intermediate portion of member 200 disposed radially inwardly of flexure region 232 and including land 206 will deflect only vertically along the longitudinal axis of plate 200 and will remain parallel to its undeflected position as it is deflected under the influence of the applied force. Thus, during deflection, surface 206 remains parallel to its undeflected position. The magnitude of force-induced deflection of surface 206 and the intermediate deflection portion disposed radially inwardly of region 232 will accurately be proportional to the magnitude of the applied load.

The force applied to surface 206 will be transmitted through lands 210 and 210a and through weld bead 226 to flex deflection member 202 in mirror image relation to deflection member 200. Thus, deflection member 202 will be flexed in two corresponding coaxial, annular, radially spaced apart regions indicated at 232a and 234a. Flexure region 232a is disposed radially inwardly of region 234a and has a curvature of flexure which is opposite to that of region 234a. Thus, member 202 will be deflected downwardly (if the force is applied downwardly to place deflection members 200 and 202 in compression) at a peripheral region disposed radially outwardly of region 232a, and owing to the inverse flexure curvatures of regions 232a and 234a, the deflected portion of member 202 disposed outwardly of region 234a will remain parallel to its undeflected position as shown in FIG. 11. The portion of deflection member 202 disposed inwardly of flexure region 232a will not be deflected by the applied force since it is seated on a rigid, non-yielding support surface.

Since the outer peripheral region of deflection member 202 yieldably deflects, it is clear that deflection member 200 will be deflected in its entirety. More particularly, the outer as well as the central portions of member 200 will deflect vertically downwardly by application of a downwardly directed force. The outer peripheral portion of member 200 disposed radially outwardly of space 230 will be deflected by virtue of the yieldable support provided by deflection member 202.

In this manner deflection member 202 cooperates with deflection member 200 in such a manner that those deflected portions of member 200 which are respectively disposed radially inwardly of region 232 and radially outwardly of region 234 remain parallel to the undeflected configuration of member 200. As a result, objectionable bowing or tilting of the region at which the force-induced deflection is measured is avoided. If member 200 were supported at land 210 on a rigid, non-yielding surface, its deflected portion would tend to bow under the influence of the applied force, and the magnitude of deflection would therefore not be consistently proportional to the magnitude of the applied force.

The same analysis applies to deflection structure 20 in the embodiment of FIGS. 1-8. There, the applied force is transmitted through regions 56 to deflection portion 54. As a result, the sections of portion 54 disposed outwardly of flexure regions 63 will be deflected downwardly (assuming the force is downward), and during deflection these sections will remain parallel to their undeflected positions owing to inverse curvatures of flexure previously described. Thus, portion 52 in its entirety will be deflected owing to the yieldable support that is provided by portion 54 at regions 56.

From the foregoing description it is clear that both structures 20 and 20' have two force deflection portions that are spaced apart in an intermediate region by a deflection space and that are rigidly and integrally joined together only outwardly of the deflection space. The force deflection portion receiving the force to be measured is yieldably supported by the other force deflection portion and transmits the applied force to the other force deflection portion so that both force deflection portions will be flexed in the previously described manner.

Referring back to FIG. 10, bores 220 and 220a are axially aligned, and together they define a through bore which is of the same configuration as bore 66 with the exception of the intermediate interruption provided by deflection space 230. Thus flanges 72 and 74, rod 68, post 70 and rod 110 are mounted and assembled in the manner described in the embodiment of FIGS. 1-8.

It will be noted in the embodiment of FIGS. 9-11 that members 200 and 202, weld 226, flanges 72 and 74, terminal box 136 and cover 172 cooperate to define a completely enclosed space which receives linkage 24 and transformer 22. A conductor hole which is formed in terminal box for passing the electrical conductors for transformer 22 may be sealed around the conductors with a plug of suitable material, thus completely sealing off the enclosure from foreign matter or particles and the like. In fact, with the sub-assembly of deflection members 200 and 202, flanges 72 and 74 and weld 226, the interior cavity receiving linkage 24 will have only one opening at the outer end of bore 120'.

What I claim is:

1. A force measuring instrument comprising a force receiving means adapted to receive a force to be measured, means supporting said force receiving means for substantially linear displacement by application of said force to said force receiving means, transducer means having a displaceable input element, motion transmitting means connecting said force receiving means to said element for transmitting the linear motion of the former to displace the latter, said motion transmitting means comprising a first motion transmitting member fixed to said force receiving means for unitary linear displacement therewith, a second member having (a) a motion transmitting portion, (b) a base portion, and (c) a flexure portion integrally joining said motion transmitting portion to said base portion, means fixing said base portion to said supporting means and against displacement by application of said force, said first member being secured to said motion transmitting portion, and said flexure portion being flexed by the linear motion of said first member to enable said motion transmitting portion to be rocked about an axis in the region of said flexure portion, and means connecting said motion transmitting portion to said element for transmitting the rocking motion of the former to displace the latter, and means for selectively preloading said flexure portion in tension.

* * * * *